3,238,171
COATING COMPOSITION COMPRISING A MIXTURE OF A POLYAZIRIDINYL COMPOUND AND AN ALKALI SOLUBLE COPOLYMER
Norwin Wolff, Cambridge, and Thomas B. Pitrolffy-Szabo, Boston, Mass., assignors to A. E. Staley Manufacturing Company, Decatur, Ill., a corporation of Delaware
No Drawing. Filed Oct. 8, 1962, Ser. No. 229,221
17 Claims. (Cl. 260—29.6)

This invention relates to a novel composition of matter and, more particularly, to a composition of matter capable of producing glossy, continuous, alkali-resistant coatings, the composition comprising a mixture of a polyaziridinyl compound and an alkali soluble copolymer of an alkyl ester of an alpha, beta-ethylenically unsaturated monocarboxylic acid and a mono-alkyl ester of itaconic acid.

In application, Serial No. 196,334, filed May 21, 1962, there are disclosed unique alkali soluble low viscosity thermoplastic emulsion copolymers which dissolve in alkali to form low viscosity solutions. As pointed out in the above application, these copolymers have the following characteristics: (1) can be produced by emulsion polymerization, (2) can be produced in an aqueous medium, (3) can be dissolved at moderately high total solids in dilute alkali without appreciably increasing the viscosity of the polymeric system, (4) can be dissolved at moderately high total solids in alkali to form a viscous polymeric system, (5) can be shipped in either the emulsified form or the solution form at high total solids, (6) can be coated as a water-thin solution or as a viscous solution at moderately high total solids depending upon the desire of the coater, (7) form a freeze-thaw stable solution. The significance of each of these properties is pointed out in the above application. While the above copolymers have all the foregoing advantages, their applied coatings are too alkali sensitive for some uses. The principal object of this invention is to provide an aqueous solution of a dissolved polyaziridinyl compound and a dissolved high molecular weight emulsion copolymer of an alkyl ester of an alpha, beta-ethylenically unsaturated monocarboxylic acid and a monoalkyl ester of itaconic acid which forms alkali resistant coatings.

As pointed out in the above application, the first of the principal components of this invention is a copolymer produced by the aqueous emulsion copolymerization of a monoalkyl ester of itaconic acid and an alkyl ester of an alpha, beta-ethylenically unsaturated monocarboxylic acid. The monoalkyl esters of itaconic acid contain from 1 to 18 carbon atoms in the alkyl group and can be represented by the formula

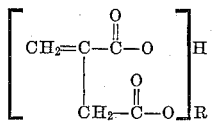

wherein R is a monovalent alkyl group of from 1 to 18 carbon atoms, such as methyl and stearyl. Preferably, R is an unsubstituted alkyl group of from 4 to 8 carbon atoms, such as n-butyl, n-hexyl, n-octyl and 2-ethylhexyl. A particularly preferred class of these copolymers contains monomethyl ester of itaconic acid and a monoalkyl ester of itaconic acid having from 4 to 8 carbon atoms in the alkyl group. As pointed out in the above application, the total of monoalkyl esters of itaconic acid can comprise from about 5 to 50 mole percent of the polymerizable monomers, and preferably from about 8 to 20 mole percent.

The alkyl esters of alpha, beta-ethylenically unsaturated monocarboxylic acids which comprise from about 40 to 95 mole percent of the monomeric units in the copolymer include "soft monomers" such as methyl acrylate, ethyl acrylate, isopropyl acrylate, butyl acrylate, amyl acrylate, hexyl acrylate, heptyl acrylate, 2-ethylhexyl acrylate, butyl methacrylate, amyl methacrylate, dodecyl methacrylate, etc., and "hard monomers" such as methyl methacrylate, tertiary butyl methacrylate, cyclohexyl acrylate, hydroxyethyl methacrylate, etc., which can be represented by the formula:

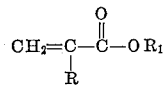

wherein R is methyl or hydrogen; when R is methyl, $R_1$ is an alkyl group of from 1 to 12 carbon atoms and when R is hydrogen, $R_1$ is an alkyl group of from 1 to 8 carbon atoms. The term "soft" is used herein in referring to polymers formed from the monomer alone, in the way that is common in this technology. (See Riddle, "Acrylic Esters," Reinhold Publishing Co., 1954, p. 58, et seq. Also Patent No. 2,795,564.) Generally, this refers to the "brittle-point" of the polymer, i.e., temperature at which the polymer breaks upon flexing. Polymers of the soft alkyl esters of an alpha, beta-ethylenically unsaturated monocarboxylic acid have brittle points below about 20° C. while the hard esters have brittle points above about 20° C.

In general, the alkyl esters are soft monomers in the above formula when R is hydrogen (acrylic esters) and $R_1$ is a primary or secondary alkyl group of from 1 to 8 carbon atoms or when R is methyl (methacrylic esters) and $R_1$ is a primary or secondary alkyl group of from 4 to 12 carbon atoms. On the other hand, the alkyl esters are hard monomers in the above formula when R is hydrogen and $R_1$ is a tertiary alkyl group or a cycloalkyl group or when R is methyl and $R_1$ is an alkyl group of from 1 to 3 carbon atoms, a tertiary alkyl group or a cycloalkyl group.

As explained in the above application, various other dissimilar copolymerizable ethylenically unsaturated comonomers such as styrene, vinylidene chloride, allyl alcohol, stearyl methacrylate, isoprene, dibutyl itaconate, dimethyl itaconate, etc., can comprise up to about 20 to 40 mole percent of the monomeric unit in the copolymer.

While the copolymer can be composed solely of a monoalkyl ester of itaconic acid and a single alkyl ester of an alpha, beta-ethylenically unsaturated monocarboxylic acid, the preferred copolymers contain at least some soft alkyl ester of an alpha, beta-ethylenically unsaturated monocarboxylic acid and some hard alkyl ester of an alpha, beta-ethylenically unsaturated monocarboxylic acid in addition to the monoalkyl ester of itaconic acid, in order to give the copolymers and coatings based thereon proper balance of hardness, freedom from tack, gloss, flexibility, etc. These copolymers preferably contain from about 20 to 87 mole percent of a soft alkyl ester (preferably at least some ethyl acrylate), from about 5 to 60 mole percent of a hard alkyl ester, and from about 8 to 20 mole percent of a monoalkyl ester of itaconic acid, the total being 100%.

As explained in the above application, the acidic emulsion copolymer can be dissolved by adding alkali to the emulsion to a pH of about 7.2 to 8.0 (clear point pH) to form water thin clear solutions or at a higher pH (above the clear point) to form water thin or viscous solutions. Suitable basic compounds include alkali metal hydroxides such as sodium hydroxide and potassium hydroxide; ammonium hydroxide; amines such as methyl amine, diethyl amine, triethyl amine, tetramethyl ammonium hydroxide; morpholine, etc. The preferred source of alkali is ammonium hydroxide although morpholine which is also volatile, is only slightly less preferred.

The second principal component in accordance with this invention is a water-soluble or alkali-soluble polyaziridinyl compound, such as tris(1-(2-methyl)-aziridinyl) phosphine oxide (MAPO), tris(1-(2-methyl)-aziridinyl) phosphine sulfide (MAPS), triethylene melamine, diethylene melamine, etc. The ratio of polyaziridinyl compound to the copolymer of this invention may be varied over a wide range. For instance, one can use between about 0.5% and 50% by weight (preferably 1%–10%) of the polyaziridinyl material to the corresponding 99.5% to 50% by weight of the copolymer.

These compositions may be applied to all sorts of surfaces for a wide variety of purposes. After application of the composition to a surface, it may be allowed to dry simply by exposure to normal atmospheric air currents. Alternatively, it may be dried by application of heated air, by application of infra-red rays, radio frequency currents, or in any other suitable manner. After drying or during drying, curing is affected by heating to a temperature of about 70° C. to 200° C. or higher for a period of time that generally vary inversely to the temperature and may be from about 10 seconds to an hour or so. The combined factors of temperature and time depend upon the particular substrate used and thickness of coating.

Aqueous ammoniacal solutions of copolymer and polyaziridinyl compound have been kept stable at room temperature for two weeks. Such compositions even after aging for two weeks have formed alkali resistant coatings with a room temperature cure. Generally, room temperature cures are not as effective with compositions which have been aged a month due to the fact that approximately 50% of the aziridinyl groups hydrolyze during a one month period. Nevertheless, these aged compositions form alkali-resistant coatings when cured at elevated temperatures.

The composition may be pigmented if clear coatings are not desired. For this purpose there may be incorporated into the composition an amount of pigment, extender, filler, delustrant, or the like, such that the weight ratio of the binder solids (polyaziridinyl compound and copolymer) to pigment is 20 to 1 to 1 to 20 depending upon the particular effect desired. Any pigments which are not sensitive to the acid groups of the copolymer may be employed including titanium dioxide, ultramarine blue, zinc oxide, zinc sulfite, barium sulfate, calcium carbonate, zinc chromate, carbon black, etc.

The coatings may be applied to all sorts of surfaces for a wide variety of purposes. They are particularly desirable for application to the surface of metals, such as iron, steel, copper, brass, aluminum, chromium, nickel and the like; to glass, porcelain, other ceramic materials; to articles made of plastic materials such as polyesters, polymers of alkyl acrylates and methacrylate, such as methyl methacrylate or copolymers thereof; wood, textile fabrics, leather, paper, cardboard, etc.

The compositions of the present invention are adapted for the pigment-printing and dyeing of textiles or finishing of textile fabrics and coating paper with either pigmented or clear coatings or surface sizing. They are characterized by excellent adhesion to all sorts of substrates especially to metals, by good gloss, by hardness, by resistance to attack by solvents, by resistance to heat, by resistance to ultra-violet light, and are characterized by good cohesion, compatibility, clarity and strength.

The following examples are merely illustrative of the invention and should not be construed as limiting the scope of the invention. The copolymers described were prepared by the method of the copending application referred to before.

*Example I*

An aqueous ammoniacal solution of 25% by weight copolymer (composed of 10.6 mole percent monobutyl itaconate, 56.7 mole percent ethyl acrylate and 32.7 mole percent methyl methacrylate) and 1% by weight MAPO was coated on a metal subtrate and cured at 70° C. for 10 minutes. The film had excellent adhesion to the substrate and excellent resistance to aqueous sodium hydroxide.

*Example II*

Example I was repeated except that a two week old ammoniacal solution was employed and the coated substrate was allowed to dry at room temperature for 24 hours. The film had excellent adhesion to the substrate and excellent resistance to aqueous sodium hydroxide.

*Example III*

Example I was repeated with essentially the same results using a four week old ammoniacal solution.

*Example IV*

Example I was repeated with essentially the same results except that 1% by weight MAPS was used in place of MAPO.

*Example V*

An aqueous ammoniacal solution of 25% by weight copolymer (composed of 10.6 mole percent monobutyl itaconate, 67.6 mole percent ethyl acrylate and 21.8 mole percent methyl methacrylate) and 0.75% by weight MAPO was coated on a linoleum substrate and dried at room temperature for 24 hours. The film had excellent adhesion to the substrate, excellent resistance to aqueous sodium hydroxide and excellent stain resistance.

*Example VI*

This example illustrates the preparation of a paint composition using MAPO and a copolymer composed of 10.6 mole percent monobutyl itaconate, 56.7 mole percent ethyl acrylate and 32.7 mole percent methyl methacrylate. The following pigment dispersion was prepared:

| | Parts | |
|---|---|---|
| | Dry | Total |
| Copolymer (20% T.S., pH 9) | 30 | 150 |
| Water | | 40 |
| Methyl Carbitol | | 20 |
| Daxad 30 | 2 | 6 |
| Antifoamer NDW | 0.50 | 0.50 |
| TiPure R-900 (titanium dioxide) | 250 | 250 |
| Sodium pyrophosphate | 0.50 | 0.50 |

The above 60% solids composition was ball milled for eight hours. Fifty-six and seven-tenths parts (34 parts dry weight) of the pigment dispersion was then compounded with an additional 100 parts (36 parts dry weight) of the above copolymer and 0.10 part Antifoamer NDW. After the paint composition was diluted with water to 40% total solids and adjusted to pH 8.2 with ammonia, 0.75 part MAPO were added. The applied paint, after drying, had good gloss.

*Example VII*

Example I was repeated with essentially the same results except that a copolymer composed of 9.7 mole percent monobutyl itaconate, 1.4 mole percent monomethyl itaconate, 15.1 mole percent methyl methacrylate, 15.1 percent ethyl acrylate, 58.6 mole percent methyl acrylate was employed.

This application is a continuation-in-part of application Serial No. 196,334, filed May 21, 1962.

Since many embodiments of this invention may be made and since many changes may be made in the embodiments described, the foregoing is to be interpreted as illustrative only, and our invention is defined by the claims appended hereafter.

We claim:

1. A composition of matter capable of producing glossy, continuous, alkali-resistance coating comprising an aqueous alkaline solution of (1) 50% to 0.5% by weight of a dissolved polyaziridinyl compound and (2) 50% to 99.5% by weight of dissolved emulsion copolymer comprising as its two essential monomers from 95 mole percent to 40 mole percent of an alkyl ester of an alpha, beta-ethylenically unsaturated monocarboxylic acid and from 5 to 50 mole percent of an alkyl half-ester of itaconic acid wherein said two essential comonomers comprise at least 60 mole percent of said copolymer.

2. A composition of matter capable of producing glossy, continuous, alkali-resistant coatings comprising an aqueous alkaline solution of (1) 50% to 0.5% by weight of a dissolved polyziridinyl compound and (2) 50% to 99.5% by weight of a dissolved emulsion copolymer comprising as its two essential ingredients from 95 to 40 mole percent of an alkyl ester of an alpha, beta-ethylenically unsaturated monocarboxylic acid and from 5 to 50 mole percent of an alkyl half-ester of itaconic acid comprising an alkyl half ester of itaconic acid having 4 to 8 carbon atoms in said alkyl half-ester group, wherein said essential two monomers comprise at least 60 mole percent of said copolymer.

3. The composition of claim 2 wherein said copolymer comprises a soft alkyl ester of an alpha, beta-ethylenically unsaturated monocarboxylic acid and a hard alkyl ester of an alpha, beta-ethylenically unsaturated monocarboxylic acid.

4. The composition of claim 2 wherein said solution is an ammoniacal solution.

5. The composition of claim 3 wherein said copolymer comprises ethyl acrylate and methyl methacrylate.

6. The composition of claim 3 wherein said polyaziridinyl compound comprises tris(1-(2-methyl)-aziridinyl) phosphine oxide.

7. The composition of claim 3 wherein polyaziridinyl compound comprises tris(1-(2-methyl)-aziridinyl) phosphine sulfide.

8. The process of forming alkali-resistant glossy coatings which comprises depositing on a substrate a thin film of an aqeuous, alkaline solution of a composition comprising (1) 50% to 0.5% by weight of a dissolved polyaziridinyl compound and (2) 50% to 99.5% by weight of a dissolved emulsion copolymer comprising as its two essential monomers from 95 mole percent to 40 mole percent of an alkyl ester of an alpha, beta-ethylenically unsaturated mono-carboxylic acid and from 5 to 50 mole percent of an alkyl half-ester of itaconic acid wherein said two essential comonomers comprise at least 60 mole percent of said copolymer, and drying said film.

9. The process of forming alkali-resistant glossy coatings which comprises depositing on a substrate a thin film of an aqueous alkaline solution of a compositon comprising (1) 50% to 0.5% by weight of a dissolved polyaziridinyl compound and (2) 50% to 99.5% by weight of dissolved emulsion copolymer comprising as its two essential monomers from 95 mole percent to 40 mole percent of an alkyl ester of an alpha, beta-ethylenically unsaturated monocarboxylic acid and from 5 to 50 mole percent of an alkyl half-ester of itaconic acid comprising an alkyl half ester of itaconic acid having from 4 to 8 carbon atoms in said alkyl half-ester groups, wherein said two essential comonomers comprise at least 60 mole percent of said copolymer and drying said film.

10. The process of claim 9 wherein said alkali soluble copolymer comprises a hard alkyl ester of an alpha, beta-ethylenically unsaturated monocarboxylic acid and a soft alkyl ester of an alpha, beta-ethylenically unsaturated monocarboxylic acid.

11. The process of claim 9 wherein said solution is an ammoniacal solution.

12. The process of claim 9 wherein said copolymer comprises ethyl acrylate and methyl methacrylate.

13. The process of claim 9 wherein said polyaziridinyl compound comprises tris(1-(2-methyl)-aziridinyl) phosphine oxide.

14. The process of claim 9 wherein said polyaziridinyl compound comprises tris(1-(2-methyl)-aziridinyl) phosphine sulfide.

15. A composition of matter capable of producing glossy, continuous, alkali-resistant coating comprising an aqueous alkaline solution of (1) 50% to 0.5% by weight of a dissolved polyaziridinyl compound and (2) 50% to 99.5% by weight of a dissolved emulsion copolymer comprising from about 20 to 87 mole percent of soft alkyl ester of an alpha, beta-ethylenically unsaturated monocarboxylic acid, from about 5 to 60 mole percent of hard alkyl ester of an alpha, beta-ethylenically unsaturated monocarboxylic and from about 8 to 20 mole percent of alkyl half-ester of itaconic acid having from 1 to 18 carbon atoms in its alkyl group, the total being 100 percent.

16. The composition of claim 1, wherein said alkyl half-ester of itaconic acid comprises monomethyl itaconate and an alkyl half-ester containing from 4 to 8 carbon atoms in the alkyl group.

17. The composition of claim 1, wherein said alkyl half-ester of itaconic acid comprises monobutyl itaconate.

References Cited by the Examiner
UNITED STATES PATENTS

| | | | |
|---|---|---|---|
| 3,037,881 | 6/1962 | McDowell | 260—29.6 |
| 3,062,686 | 11/1962 | Graulich et al. | 260—29.6 |
| 3,093,602 | 6/1963 | Boeth et al. | 260—29.6 |

MURRAY TILLMAN, *Primary Examiner.*